United States Patent [19]

Brady

[11] E Re. 29,195

[45] Reissued Apr. 26, 1977

[54] 3-(3-CHLORO-2-PROPENYL)-1,3,5,7-TETRAAZABICYCLO(3.3.1)NONANE AND ITS PREPARATION

[75] Inventor: Thomas P. Brady, Natick, Mass.

[73] Assignee: The Dow Chemical Company, Midland, Mich.

[22] Filed: Dec. 8, 1975

[21] Appl. No.: 638,790

Related U.S. Patent Documents

Reissue of:

[64] Patent No.: 3,862,939
Issued: Jan. 28, 1975
Appl. No.: 408,889
Filed: Oct. 23, 1973

[52] U.S. Cl. ..... 260/248 NS; 424/249
[51] Int. Cl.[2] ..... C07D 251/72
[58] Field of Search ..... 260/248 NS

[56] References Cited

UNITED STATES PATENTS 3,228,829 1/1966 Wolf et al. ..... 260/248 X

*Primary Examiner*—John M. Ford
*Attorney, Agent, or Firm*—Theodore Post; C. Kenneth Bjork

[57] ABSTRACT

[ 7-] *3*-Cis- or [ 7 ]*3*-cis-trans-(3-Chloro-2-propenyl)-1,3,5,7-tetraazabicyclo(3.3.1)nonane [-3-methanol ] is prepared by reacting cis-, or cis-trans-[ 7 ] *1*-(3-chloro-2-propenyl)-3,5,7-triaza-1-azoniatricyclo(3.3.1.1$^{3,7}$)decane chloride with excess aqueous strong base at room temperature to give the corresponding [ carbinolamine, 7-] *3*-(3-chloro-2-propenyl)-1,3,5,7-tetraazabicyclo(3.3.1)nonane [-3-methanol ].

4 Claims, No Drawings

3-(3-CHLORO-2-PROPENYL)-1,3,5,7-TETRAAZABICYCLO(3.3.1)NONANE AND ITS PREPARATION

Matter enclosed in heavy brackets [ ] appears in the original patent but forms no part of this reissue specification; matter printed in italics indicates the additions made by reissue.

BACKGROUND OF THE INVENTION

The art describes the conversion of N-methyl hexamethylene tetramine salts to form in low yields the N-methyl hexamethylene tetramine hydroxide; U.S. Pat. No. 1,336,709, Apr. 13, 1920 and Foss et al., J. Chem. Soc., 1950, 624. Neither reference shows any utility for the resulting hydroxide. In the first reference, a solution of barium hydroxide is used to react with the N-methyl hexamethylenetetramine salt, while in the second reference, moist silver oxide is used.

SUMMARY OF THE INVENTION

This invention concerns the novel compounds [ 7- ] *3*--cis- and [ 7- ] *3*-cis-trans-(3-chloro-2-propenyl)-1,3,5,7-tetraazabicyclo(3.3.1)nonane [-3-methanol hereinafter referred to as "Carbinolamine" or "Carbinolamines" ]. The [ Carbinolamines ] *title compounds* are prepared by reacting cis-1-(3-chloro-2-propenyl)-3,5,7-triaza-1-azoniatricyclo(3.3.1.1$^{3,7}$)decane chloride, commercially available as Dowicil® 200 or cis-trans-1-(3-chloro-2-propenyl)-3,5,7-triaza-1-azoniatricyclo(3.3.1.1$^{3,7}$)-decane chloride, commercially available as Dowicil® 100, with excess aqueous strong base, e.g., an alkali metal hydroxide such as sodium hydroxide or potassium hydroxide or other strong water-soluble base at substantially room temperature, i.e., at or slightly below 25° C., according to the following equation

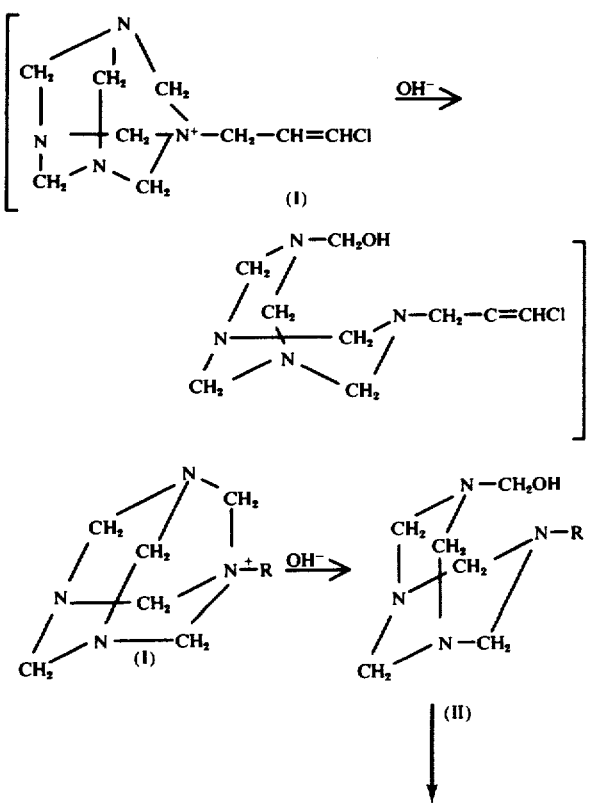

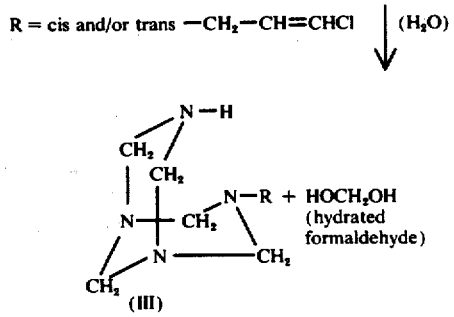

*In the reaction, the intermediate carbinolamine, II, is in equilibrium in the aqueous media with product, III, and hydrated formaldehyde. The equilibrium, as observed with C$^{13}$ nuclear magnetic resonance spectroscopy, apparently lies predominantly toward product III. In isolating III by extraction into organic solvent, the reaction to the tetraazabicyclononane, III is essentially complete, leaving the dissociated formaldehyde in the aqueous phase.* In the reaction, up to about 5 moles of base per mole of starting cis- or cis-trans- compound (I) are used, and preferably from about 2 to about 5 moles of base per mole of starting cis- or cis-trans- compound. The [ Carbinolamine ] product is extracted from the reaction medium with a water-immiscible organic solvent, such as methylene chloride or benzene, to give in high yield the [ Carbinolamines ] *N-(chloropropenyl)-tetraazabicyclononanes* as high boiling viscous oils, slightly immiscible with water but highly soluble in organic solvents such as aromatic solvents, chlorinated hydrocarbons, ethers, alcohols and ketones. The structures of [ the Carbinolamines ] *III* are confirmed by proton and C$^{13}$ nuclear magnetic resonance spectra, and by mass spectrometry.

DESCRIPTION OF THE PREFERRED EMBODIMENTS

The following examples and teachings additionally describe specific embodiments and the best mode contemplated by the inventor of carrying out the invention.

EXAMPLE 1

50.0 Grams of cis-1-(3-chloro-2-propenyl)-3,5,7-triaza-1-azoniatricyclo(3.3.1.1$^{3,7}$)decane chloride (0.2 mole) was added gradually to a solution of 16.0 grams NaOH (0.4 mole) in 100 ml. of $H_2O$ and the reaction mixture stirred about 15 minutes at room temperature. The oily aqueous reaction mixture was extracted twice with 200 ml. portions of $CH_2Cl_2$ and the phases allowed to separate. The $CH_2Cl_2$ phases were drawn off in a separatory funnel and dried with molecular sieves. The $CH_2Cl_2$ was removed in vacuo, 40°/20 mm. mercury, to give 36.0 grams of product, [ cis-Carbinolamine. ] *cis-III.*

EXAMPLE 2

100 Grams (0.4 mole) of cis-1-(3-chloro-2-propenyl)-3,5,7-triaza-1-azoniatricyclo(3.3.1.1$^{3,7}$)decane chloride was added slowly to a solution of 80 grams (2.0 mole) NaOH dissolved in 500 ml. $H_2O$ and the reaction mixture stirred 15 minutes at room temperature. Product cis-[ Carbinolamine ] was extracted with benzene, dried over $Na_2SO_4$ and the benzene evaporated to give 72 grams ( [ 78% ] *89%* yield) [ at ] *as* a viscous oil, [ cis-Carbinolamine. ] *cis-III.*

The procedures of Example 1 and 2 when repeated with Dowicil® 100 give [cis-trans-Carbinolamine product.] *cis-trans-III.*

The [Carbinolamines] *N-(chloropropenyl)-tetraazabicyclononanes* of this invention have antimicrobial activity. In representative operations, both the cis- and the cis-trans- [Carbinolamines] *III* when tested for antimicrobial activity using conventional agar dilution tests give complete growth inhibition against Staphylococcus aureus and Aerobacter aerogenes at a concentration of 50 p.p.m. and against Pseudomonas aeruginosa at 75 p.p.m.

What is claimed is:

1. A member of the group consisting of [7-] *3*-cis-(3-chloro-2-propenyl)-1,3,5,7-tetraazabicyclo(3.3.1)-nonane [-3-methanol] and [7-] *3*-cis-trans-(3-chloro-2-propenyl)-1,3,5,7-tetraazabicyclo(3.3.1)nonane [-3-methanol].

2. [7-] *3*-Cis-(3-chloro-2-propenyl)-1,3,5,7-tetraazabicyclo(3.3.1)nonane [-3-methanol].

3. [7-] *3*-Cis-trans-(3-chloro-2-propenyl)-1,3,5,7-tetraazabicyclo(3.3.1)nonane [-3-methanol].

4. A method for making a *3*-cis- or a mixture of *3*-cis- and trans- [7-] -(3-chloro-2-propenyl)-1,3,5,7-tetraazabicyclo(3.3.1)nonane [-3-methanol] which comprises reacting at room temperature cis- or cis-trans- 1-,3-chloro-2-propenyl)-3,5,7-triaza-1-azonia-tricyclo(3.3.1.1$^{3,7}$)-decane chloride with excess aqueous strong base and recovering the respective product [7-] *3*-(3-chloro-2-propenyl)-1,3,5,7-tetraazabicyclo(3.3.1)nonane [-3-methanol] from the reaction medium.

* * * * *